US012775483B2

(12) United States Patent
Arnaudov et al.

(10) Patent No.: US 12,775,483 B2
(45) Date of Patent: Oct. 27, 2026

(54) UNIFIED DEPLOYMENT OF CONTAINER INFRASTRUCTURE AND RESOURCES

(71) Applicant: VMware LLC, Palo Alto, CA (US)

(72) Inventors: Nikola Anastasov Arnaudov, Sofia (BG); Petya Georgieva Aleksandrova, Sofia (BG); Dimo Andonov Donchev, Varna (BG)

(73) Assignee: VMware LLC, Palo Alto, CA (US)

( * ) Notice: Subject to any disclaimer, the term of this patent is extended or adjusted under 35 U.S.C. 154(b) by 809 days.

(21) Appl. No.: 18/156,588

(22) Filed: Jan. 19, 2023

(65) Prior Publication Data

US 2024/0248741 A1 Jul. 25, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC combination set(s) only.
See application file for complete search history.

(56) References Cited

U.S. PATENT DOCUMENTS 11,711,315 B1 * 7/2023 Fernandes ............ H04L 47/781 709/226
2013/0232498 A1 9/2013 Mangtani et al.
2020/0110638 A1 * 4/2020 Asthana .................. H04L 67/51
2021/0055917 A1 * 2/2021 Khakare ............ G06F 9/45558
2021/0141655 A1 * 5/2021 Gamage .............. G06F 9/45545
2021/0311762 A1 * 10/2021 Shepherd ............ G06F 9/45558
2022/0004410 A1 * 1/2022 Chen ......................... G06F 8/60
2023/0107891 A1 * 4/2023 Miriyala ............. G06F 9/45558 370/254

OTHER PUBLICATIONS

Extended European Search Report, European Application No. 241526687.2 dated Apr. 10, 2024, 9 pages.

* cited by examiner

*Primary Examiner* — Kenneth Tang
(74) *Attorney, Agent, or Firm* — King Intellectual Asset Management

(57) ABSTRACT

Systems and methods for unified virtual infrastructure and containerized workload deployment via a deployment platform include receiving, at the deployment platform, a definition of the virtual infrastructure and the containerized workload, sending, by the deployment platform, first information comprising the definition of the virtual infrastructure to an infrastructure manager configured to deploy the virtual infrastructure including a container orchestrator, and sending, by the deployment platform, second information comprising the definition of the containerized workload to the container orchestrator configured to deploy the containerized workload on the deployed virtual infrastructure.

20 Claims, 8 Drawing Sheets

UNIFIED DEPLOYMENT OF CONTAINER INFRASTRUCTURE AND RESOURCES

BACKGROUND

Modern applications are applications designed to take advantage of the benefits of modern computing platforms and infrastructure. For example, modern applications can be deployed in a multi-cloud or hybrid cloud fashion, such as, consuming both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that access a shared operating system (OS) kernel. Containerized applications, also referred to as containerized workloads, can include a collection of one or more related applications packaged into one or more groups of containers, referred to as pods.

Containerized workloads may run in conjunction with a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing. Kubernetes® (K8S®) software is an example open-source container orchestration platform that automates the operation of such containerized workloads.

Developers typically use different platforms to 1) deploy infrastructure (herein, described as deployed infrastructure) that supports the containerized workloads, and 2) to deploy the containerized workloads and resources on the deployed infrastructure. For example, an infrastructure deployment platform may be used to deploy infrastructure, while an application deployment platform may be used to deploy containerized workloads and resources.

Deployment of infrastructure, as discussed herein, refers to deployment of virtual infrastructure on physical machines (e.g., servers). The virtual infrastructure may include a container cluster (e.g., a K8S cluster). The container cluster may include components that support execution of containerized workloads, such as a control plane and worker nodes (e.g., virtual machines), as further discussed herein. Further, one or more namespaces may be defined in the container cluster, each namespace isolating resources within the namespace from resources in other namespaces of the cluster. Deployment of containerized workloads and resources on the deployed infrastructure may refer to deployment of one or more pods of containers running the workload and resources that support the workload on the deployed infrastructure. Resources (also referred to as application resources) may include one or more of: one or more load balancers to balance incoming requests across multiple instances of a containerized workload, one or more custom resources, one or more services to expose pods as a network service, and/or the like, such as other types of Kubernetes resources.

Accordingly, each of the infrastructure and the containerized workloads are deployed separately using different platforms. Such separated deployment using different platforms may result in increased troubleshooting time, difficulty in tracking updates across different platforms (e.g., difficulty in version control), and the like.

SUMMARY

One or more embodiments provide a method for unified virtual infrastructure and containerized workload deployment via a deployment platform. The method generally includes receiving, at the deployment platform, a definition of the virtual infrastructure and the containerized workload, sending, by the deployment platform, first information comprising the definition of the virtual infrastructure to an infrastructure manager configured to deploy the virtual infrastructure including a container orchestrator, and sending, by the deployment platform, second information comprising the definition of the containerized workload to the container orchestrator configured to deploy the containerized workload on the deployed virtual infrastructure.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
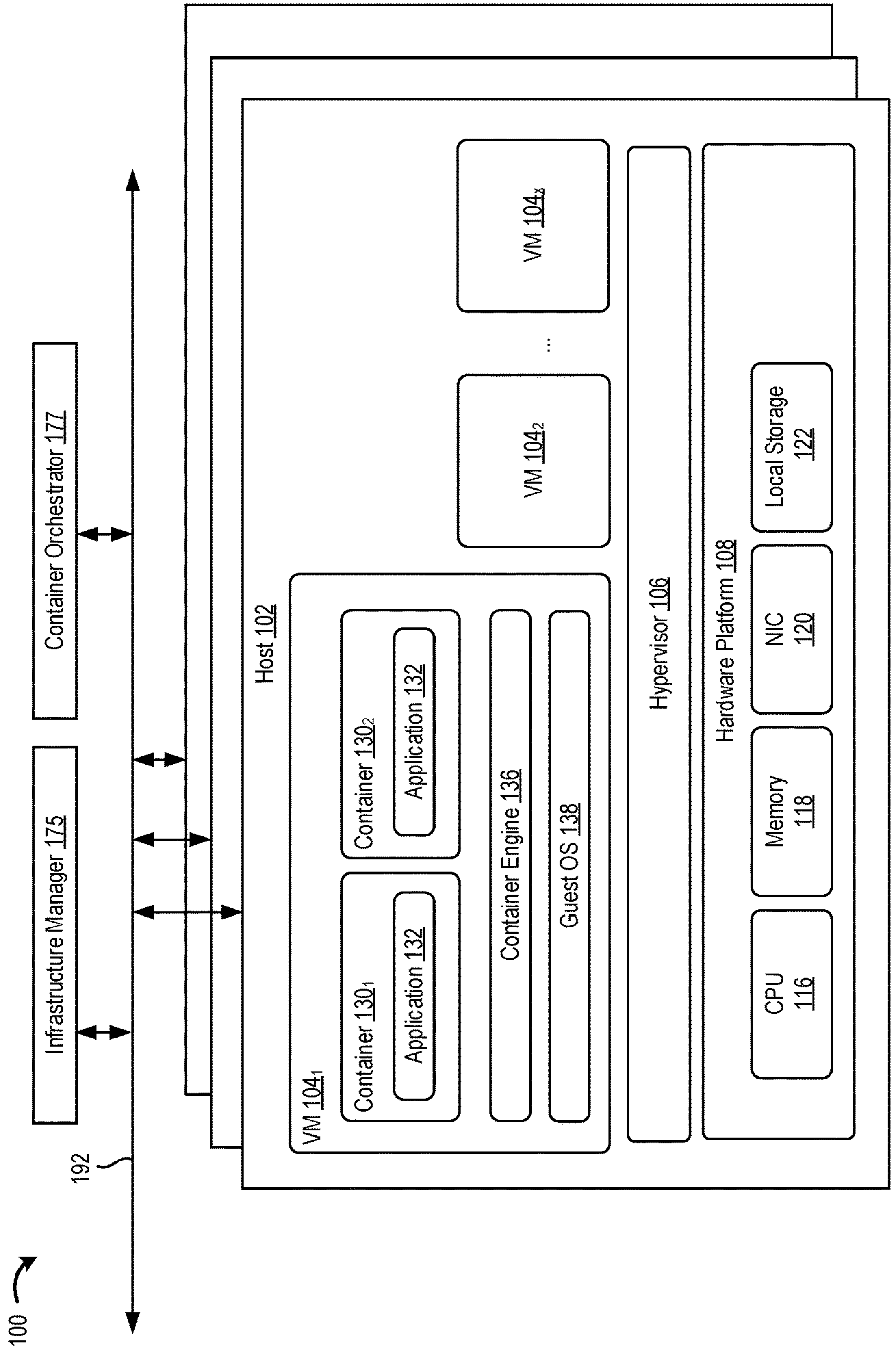
FIG. 1 illustrates a computing system in which embodiments described herein may be implemented, according to aspects of the present disclosure.

The present disclosure provides techniques for unified deployment of virtual infrastructure and containerized workloads using a single unified deployment platform. In certain aspects, deployment of containerized workloads also includes deployment of one or more resources on the virtual infrastructure that support the containerized workloads. Accordingly, a user is able to provide input to a single unified deployment platform to deploy both virtual infrastructure and containerized workloads, as opposed to having to provide separate inputs to separate infrastructure and application deployment platforms. In some cases, the user is able, through a single input (e.g., click) to the unified deployment platform, start a workflow that automatically deploys a virtual infrastructure and containerized workloads, such as defined in a unified deployment configuration template.

The use of a single unified deployment platform provides several advantages over prior techniques for separately deploying infrastructure and containerized workloads that run on the deployed infrastructure. For example, a user does not have to login to separate platforms, such as using different credentials, in order to deploy both the infrastructure and containerized workloads. Further, use of separate platforms also often requires use of a separate set of tools to manage and/or view the application components of the deployed application. Further, a user is able to track versions of the deployment as the deployment is updated in a single platform, as opposed to having to track separately versions of deployed infrastructure and versions of deployed containerized workloads, and maintain correlations between the two.

In certain aspects, the configuration of the virtual infrastructure and containerized workloads to be deployed are defined in a single unified deployment configuration template. The unified deployment configuration template may define a virtual infrastructure across clouds, an orchestration layer, and containerized workloads disposed thereon. Such a unified deployment configuration template is able to be used by the deployment platform to deploy both virtual infrastructure and containerized workloads. Further, the unified deployment configuration template also allows for editing of a single template to perform code management such as performing troubleshooting or making updates, such as version updates, which aids with repeatability, increased visibility of code management, increased efficiency and reduced time to manage such deployments from the single location.

The unified deployment configuration template may be stored as one or more files, or a single file. The user may provide the single unified deployment configuration template to the single unified deployment platform, and use an input (e.g., a single input) to begin the workflow for deploying the virtual infrastructure and containerized workloads automatically. Use of a single file may further help with version control, as each update to the single unified deployment configuration template, regardless of whether the update is to the infrastructure, workload(s), or both, results in a new updated version of the single file. Such a single file can be easily tracked for version updates. The single unified deployment configuration template, in certain aspects, may be defined by a user using any suitable editors, such as a text editor.

Certain aspects also provide a graphical user interface (GUI) for the single unified deployment platform that helps in creation of a single unified deployment configuration template. The GUI may present infrastructure components, containerized workloads, and resources as items that can be selected and arranged on a canvas to visually build a deployment including both infrastructure and containerized workloads. The GUI presents a unified view to the user of infrastructure and workloads, prior to their deployment. Such unified view was previously unavailable, and users had to sort through many different user interfaces to try to piece together what the overall deployment may look like.

It should be noted that though certain aspects are discussed using Kubernetes as an example, the techniques discussed herein may be similarly applicable to other suitable container orchestration platforms. Further, though certain techniques are discussed with respect to deploying applications as containerized workloads on the operating systems of VMs as an example, it should be noted that such techniques are similarly applicable to deploying containerized workloads on the operating systems of physical machines as well.

FIG. 1 is a block diagram that illustrates a computing environment 100 in which embodiments described herein may be implemented. Computing environment 100 includes one or more hosts 102 connected by a physical network 192. In particular, physical network 192 enables communication between hosts 102, and/or between other components and hosts 102.

Hosts 102 may be in a single host set or logically divided into a plurality of host sets. A host set is a set of hosts whose physical resources (e.g., compute, memory, networking) are collectively managed as pooled resources by an infrastructure manager 175. The infrastructure manager 175 is configured to deploy virtual infrastructure on the physical resources and manage the deployed virtual infrastructure. The infrastructure manager 175 may provide a provider application programming interface (API) 275 (FIG. 2) to allow requests to be submitted to the infrastructure manager 175, such as requests to deploy virtual infrastructure. The infrastructure manager 175 may be part of a public cloud or private cloud orchestration platform, such as VMware® Aria Automation or VMware vCenter.

Each host 102 may be configured to provide a virtualization layer, also referred to as a hypervisor 106, that abstracts processor, memory, storage, and networking resources of a hardware platform 108 of each host 102 into multiple VMs $104_1$ to $104_N$ (collectively referred to as VMs 104 and individually referred to as VM 104) that run concurrently on the same host 102.

Hardware platform 108 of each host 102 includes components of a computing device such as one or more processors (central processing units (CPUs)) 116, memory 118, a network interface including one or more network adapters, also referred to as NICs 120, and/or storage 122. CPU 116 is configured to execute instructions that may be stored in memory 118 and in storage 122. The computing components described herein are understood to be communicatively coupled.

In certain aspects, hypervisor 106 may run in conjunction with an operating system (not shown) in host 102. In some embodiments, hypervisor 106 can be installed as system level software directly on hardware platform 108 of host 102 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 106 implements one or more logical entities, such as logical switches, routers, etc. as one or more virtual entities such as virtual switches, routers, etc. In some implementations, hypervisor 106 may comprise system level software as well as a "Domain 0" or "Root Partition" virtual machine (not shown), which is a privileged machine that has access to the physical hardware resources of the host. In this implementation, one or more virtual switches and/or other network components, along with hardware drivers, may reside in the privileged virtual machine.

Each VM 104 includes a virtual hardware platform that supports the installation of a guest OS 138 which is capable of executing one or more applications. Guest OS 138 may be a standard, commodity operating system such as Microsoft Windows or Linux.

In certain embodiments, each VM 104 includes a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers $\mathbf{130}_1$ to $\mathbf{130}_Y$ (collectively referred to as containers 130 and individually referred to as container 130) are packages including application code and dependencies to reliably execute within isolated namespaces, or execution spaces, maintained by the guest OS. That is, with containerization, the kernel of guest OS 138, or an OS of host 102 if the containers are directly deployed on the OS of host 102, is configured to provide multiple isolated user space instances, referred to as containers. Containers 130 or groups of containers referred to as pods appear as unique servers from the standpoint of an end user that communicates with each of containers 130. However, from the standpoint of the OS on which the containers execute, the containers are user processes that are scheduled and dispatched by the OS.

Containers 130 encapsulate an application, such as application 132 as a single executable package of software that bundles application code together with all of the related configuration files, libraries, and dependencies required for it to run. Application 132 may be any software program, such as a word processing program.

In certain embodiments, computing environment 100 can include a container orchestrator 177. Container orchestrator 177 implements an orchestration control plane, such as a Kubernetes control plane, to deploy and manage applications and/or services and resources thereof on hosts 102. For example, container orchestrator 177 may deploy containers 130 as a set of pods on a container-based cluster running on a set of hosts. Container orchestrator 177 may run on one or more VMs 104 and/or hosts 102.

Figure 2:
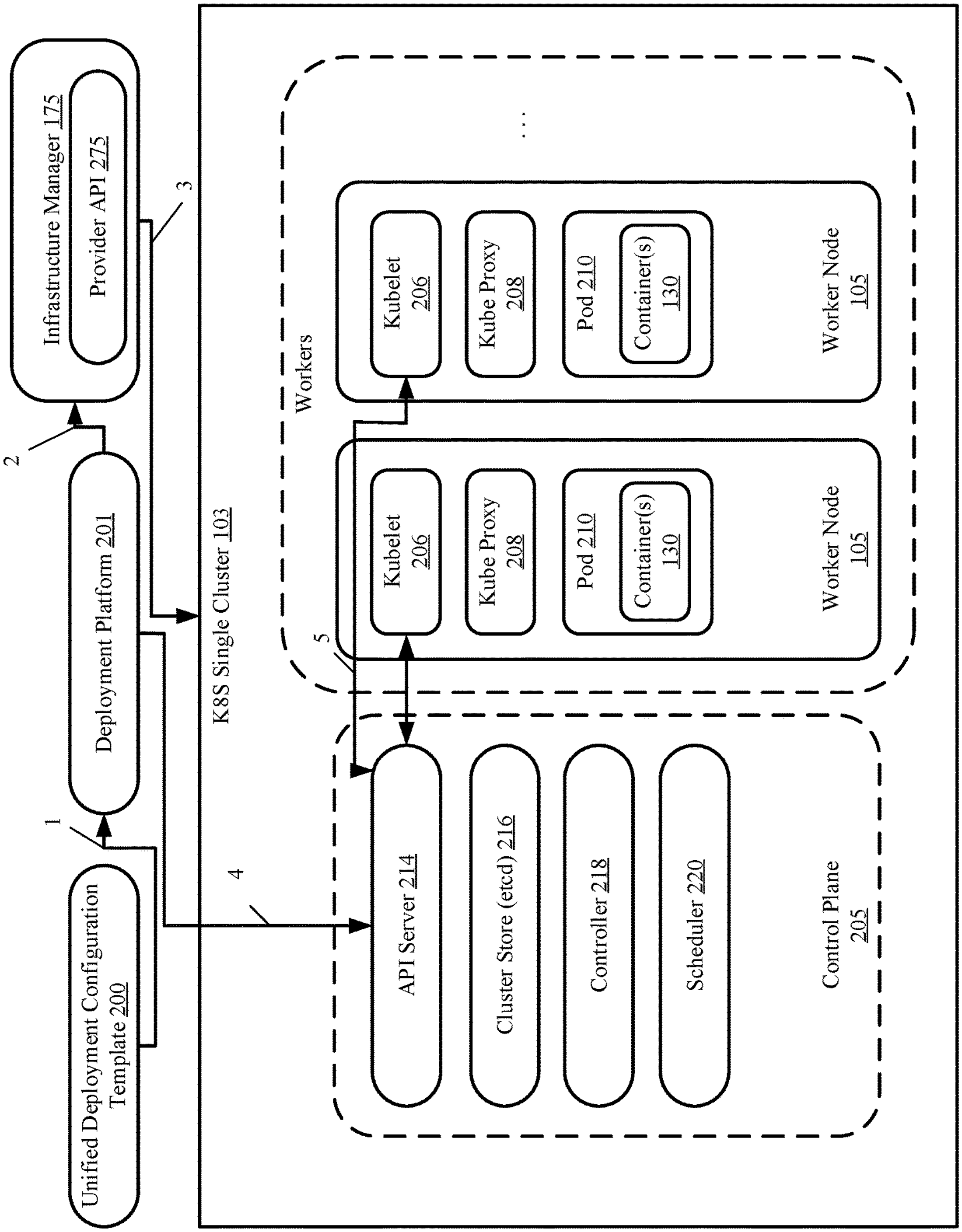
FIG. 2 illustrates a block diagram of an example workflow for unified deployment of infrastructure and containerized workloads in the computing system of FIG. 1, according to aspects of the present disclosure.

An example container-based cluster for running containerized workloads is illustrated in FIG. 2. It should be noted that the block diagram of FIG. 2 is a logical representation of a container-based cluster, and does not show where the various components are implemented and run on physical systems. While the example container-based cluster shown in FIG. 2 is a Kubernetes (K8S) cluster 103, in other examples, the container-based cluster may be another type of container-based cluster based on container technology, such as Docker clusters.

K8S cluster 103 illustrated in FIG. 2 includes a combination of worker nodes 105 and a control plane 205. In certain aspects, worker nodes 105 are VMs, such as VMs 104, or physical machines, such as hosts 102. Components of control plane 205 run on VMs or physical machines. In certain aspects, container orchestrator 177 implements control plane 205. Worker nodes 105 are managed by control plane 205, which manages the computation, storage, and memory resources to run all worker nodes 105. Though pods 210 of containers 130 are shown running on the cluster 103, the pods may not be considered part of the cluster infrastructure, but rather as containerized workloads running on the cluster 103.

Each worker node 105 includes a kubelet 206, which is an agent that ensures that one or more pods 210 run in the worker node 105 according to a defined specification for the pods, such as defined in a workload definition manifest that may be part of a unified deployment configuration template described herein. Each pod 210 may include one or more containers 130. The worker nodes 105 can be used to execute various applications and software processes using container 130. Further each worker node 105 includes a kube proxy 208. Kube proxy 208 is a Kubernetes network proxy that maintains network rules on worker nodes 105.

Such network rules may be based on policies defined in the unified deployment configuration template described herein. These network rules allow for network communication to pods 210 from network sessions inside and/or outside of K8S cluster 103.

Control plane 205 includes components such as an API server 214 (e.g., a resource API of a resource manager), a cluster store (etcd) 216, a controller 218, and a scheduler 220. Control plane 205's components make global decisions about K8S cluster 103 (e.g., scheduling), as well as detect and respond to cluster events (e.g., starting up a new pod 210 when a workload deployment's replicas field is unsatisfied).

API server 214 operates as a gateway to K8S cluster 103. As such, a command line interface, web user interface, users, and/or services communicate with K8S cluster 103 through API server 114. One example of a Kubernetes API server 214 is kube-apiserver, which kube-apiserver is designed to scale horizontally—that is, this component scales by deploying more instances. Several instances of kube-apiserver may be run, and traffic may be balanced between those instances.

Cluster store (etcd) 216 is a data store, such as a consistent and highly-available key value store, used as a backing store for all K8S cluster 103 data.

Controller 218 is a control plane component that runs and manages controller processes in K8S cluster 103.

Scheduler 220 is a control plane 205 component configured to allocate new pods 210 to worker nodes 105. Additionally, scheduler 220 may be configured to distribute node resources and/or workloads across worker nodes 105. Node resources may refer to processor resources, memory resources, networking resources, and/or the like. Scheduler 220 may watch worker nodes 105 for how well each worker node 105 is handling their workload, and match available node resources to the worker nodes 105. Scheduler 220 may then schedule newly created containers 130 to one or more of the worker nodes 105.

In other words, control plane 205 manages and controls every component of the cluster 103. Control plane 205 handles most, if not all, operations within cluster 103, and its components define and control cluster 103's configuration and state data. Control plane 205 configures and runs the deployment, management, and maintenance of containerized applications.

As discussed, for a user to deploy virtual infrastructure, such as cluster 103, as well as containerized workloads, such as pods 210, that run on the virtual infrastructure, a user may need to separately deploy the virtual infrastructure and the containerized workloads using different platforms. For example, a user may need to access infrastructure manager 175 to deploy the virtual infrastructure, such as via provider API 275. The user may then need to access control plane 205, such as via API server 214, to deploy the containerized workloads, and in some cases application resources as discussed, on the virtual infrastructure.

Accordingly, certain aspects discussed herein provide a unified deployment platform 201 that allows a user to deploy both virtual infrastructure, as well as containerized workloads that run on the virtual infrastructure, from a single platform. The deployment platform 201 may run on one or more physical machines, virtual machines, or other virtual computing instances.

In certain aspects, at a first step 1, a user provides a definition of a virtual infrastructure and one or more containerized workloads that run on the virtual infrastructure to the deployment platform 201. In certain aspects, the definition is included in a unified deployment configuration template 200. The unified deployment configuration template 200 may be created by the user external to deployment platform 201, or may be created using a GUI of deployment platform 201, such as described further herein.

A definition of a virtual infrastructure includes data, such as code, that identifies components of the virtual infrastructure and the configuration parameters of such components. For example, the definition of the virtual infrastructure may identify which components to include in the virtual infrastructure (e.g., worker nodes, controllers, and/or the like) as well as how many (e.g., three worker nodes, two controllers, etc.). The definition of the virtual infrastructure may further define configuration parameters for components, such as defining one or more of: on which physical infrastructure the component should be instantiated, which physical resources are allocated to running the component, and/or the like.

A definition of a containerized workload includes data, such as code, that identifies which applications are to be included in the containerized workload, and to how they are to be grouped into pods. In certain aspects, the definition of the containerized workload further identifies resources used to support the pods, as discussed, and configuration parameters of the resources. For example, the definition of the containerized workload may identify a first set of applications to be instantiated as four containers in two pods. The definition of the containerized workload may further identify a load balancer configured to distribute requests between the two pods, and configuration parameters of how the load balancer works (e.g., round robin, etc.).

The user further provides an input (e.g., a single input, such as a single click on a deploy button on a GUI of the deployment platform 201) to begin automated deployment of the virtual infrastructure and one or more containerized workloads on a set of physical machines, such as hosts 102. The automated deployment, in certain aspects, does not require further user input to achieve deployment of the virtual infrastructure and one or more containerized workloads.

Continuing, at a second step 2, the deployment platform 201 provides first information, including a definition of the virtual infrastructure, to infrastructure manager 175, such as via an API call to provider API 275. The definition of the virtual infrastructure may include a definition of a cluster including a control plane and worker nodes. For example, the definition may define a number of worker nodes to include in the cluster, which hardware worker nodes should run on, a configuration of the control plane, such as redundancy for high availability, and/or the like. Accordingly, at a third step 3, infrastructure manager 175 deploys the virtual infrastructure on physical machines, such as by deploying cluster 103 on host(s) 102. The infrastructure manager 175, as part of deploying virtual infrastructure, deploys a controller orchestrator (e.g., controller orchestrator 175), such as control plane 205 of cluster 103

Further, at a fourth step 4, the deployment platform 201 provides second information, including a definition of the containerized workloads, to a container orchestrator, such as control plane 205 of cluster 103 deployed by the infrastructure manager 175. The second information may include a definition of application resources to deploy on the virtual infrastructure, pods to deploy on the virtual infrastructure, containers to include in the pods, and/or the like. For example, the deployment platform 201 provides the second information via an API call to API server 214. The container orchestrator, at a fifth step 5, deploys the containerized workloads, and in some cases application resources, on the virtual infrastructure, such as deploying pods 210 on worker nodes 105.

Therefore, FIG. 2 illustrates a process for a user to achieve unified deployment of both virtual infrastructure and containerized workloads running thereon using a single unified deployment platform 201.

Figure 3:
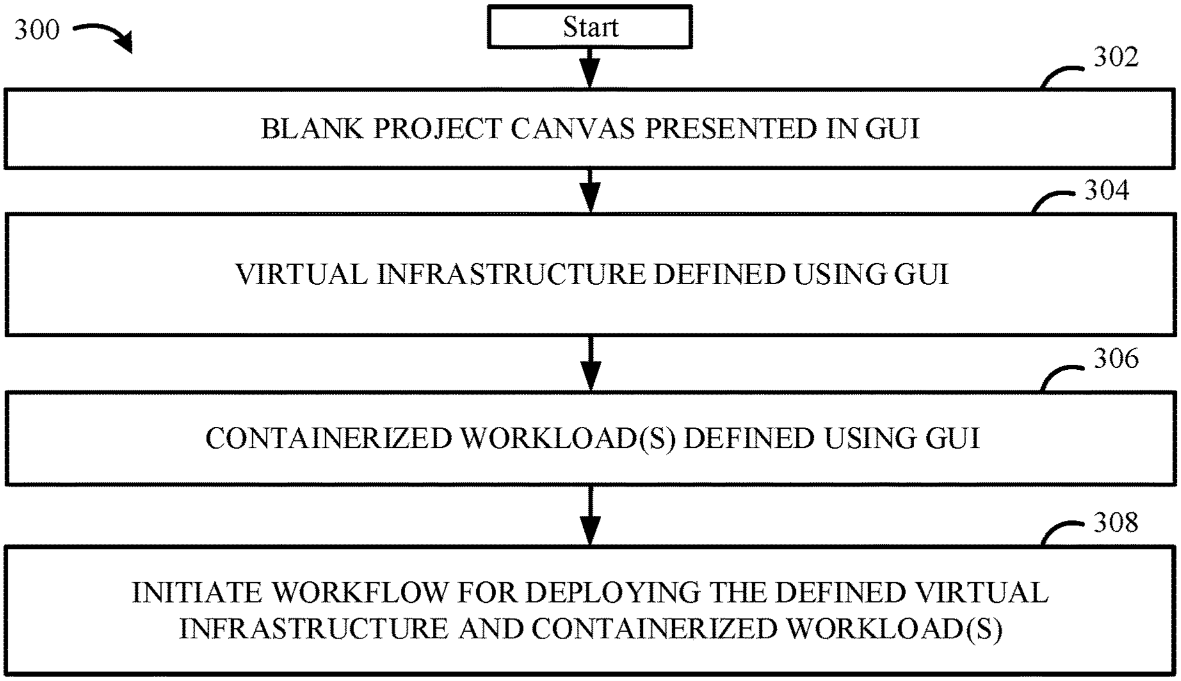
FIG. 3 is a flow diagram illustrating example operations for unified deployment of infrastructure and containerized workloads in a deployment platform using a graphical user interface (GUI) of the deployment platform to build a unified deployment configuration template, according to aspects of the present disclosure.

FIG. 3 is a flow diagram illustrating example operations 300 for deployment of virtual infrastructure and containerized workloads in the deployment platform 201 (FIG. 2) using a GUI to build a unified deployment configuration template 200 (FIG. 2). At operation 302, a user is presented with a blank project canvas in the GUI. The blank project canvas can be used by the user to define a unified deployment configuration template, including virtual infrastructure and one or more containerized workloads.

Figure 4:
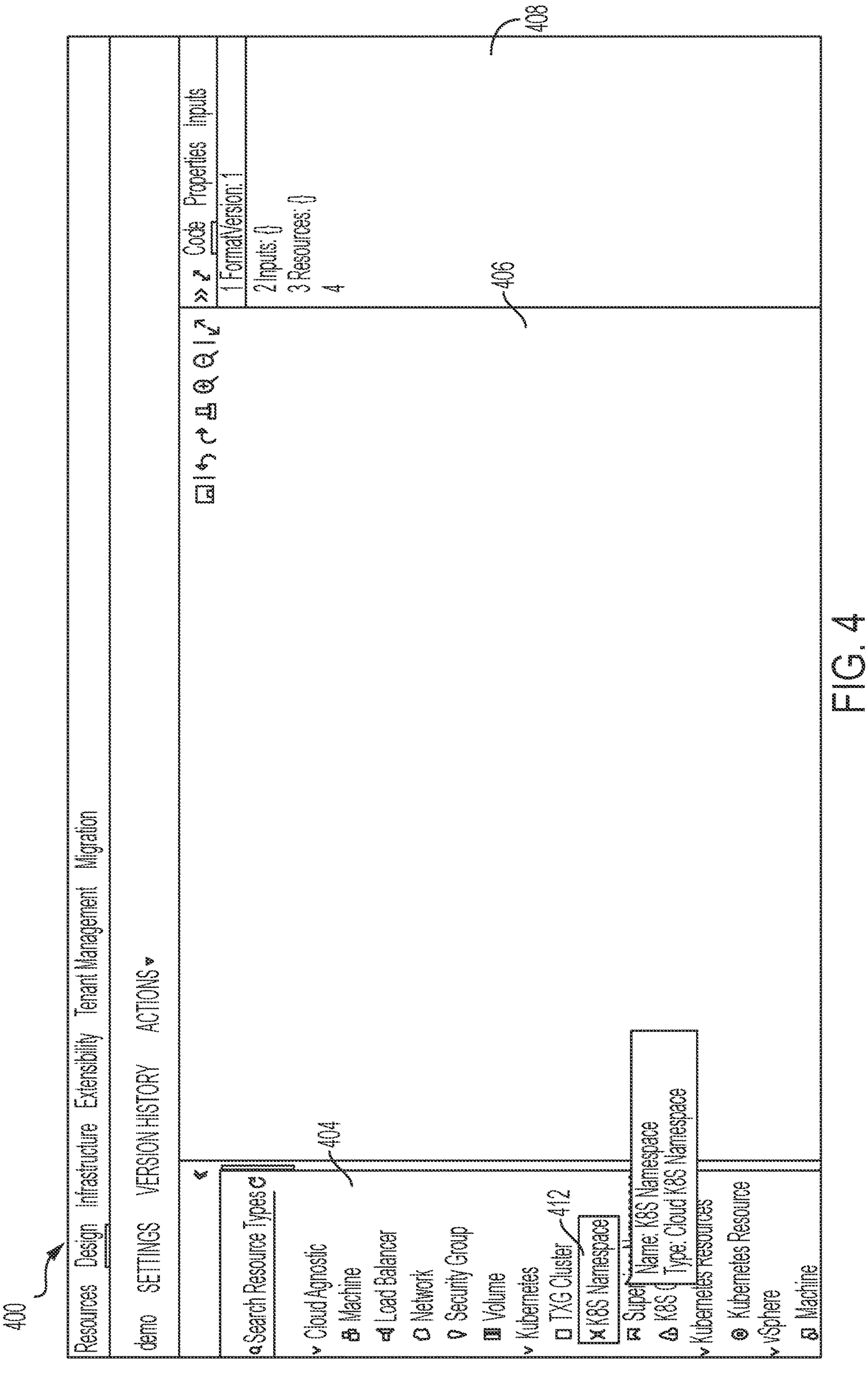
FIGS. 4-8 are schematic depictions of a GUI of the deployment platform, according to aspects of the present disclosure.

For example, FIG. 4 illustrates an example GUI 400 of deployment platform 201. As shown, a canvas view of GUI 400 illustrates a project canvas 406, onto which a user can add visual representations of virtual infrastructure components and containerized workloads. In certain aspects, the containerized workloads are defined by application resources, which can be added to the project canvas 406.

GUI 400 further includes an icon selection portion 404. The icon selection portion 404 includes virtual infrastructure components and application resources that can be selected and an instance of the selected component or resource added to the project canvas 406, such as by dragging and dropping the component or resource to the project canvas 406. For example, icon selection portion 404 illustrates selectable resources such as a load balancer, network, security group, etc. Icon selection portion 404 further illustrates selectable infrastructure components, such as a K8s cluster, and namespace 412.

GUI 400 further includes a code area 408. Code area 408 can be used to view and/or edit code associated with components and/or resources added to project canvas 406. For example, as components and/or resources are added to the project canvas, corresponding YAML definitions are added to the code area 408. YAML is a data interchange format used as an example. The code may be in any suitable format. A user can edit the code in code area 408 to further define components and/or resources to be deployed, such as editing code for components and/or resources added to the project canvas 406 from icon selection portion 404, or initially defining components and/or resources.

Figure 5:
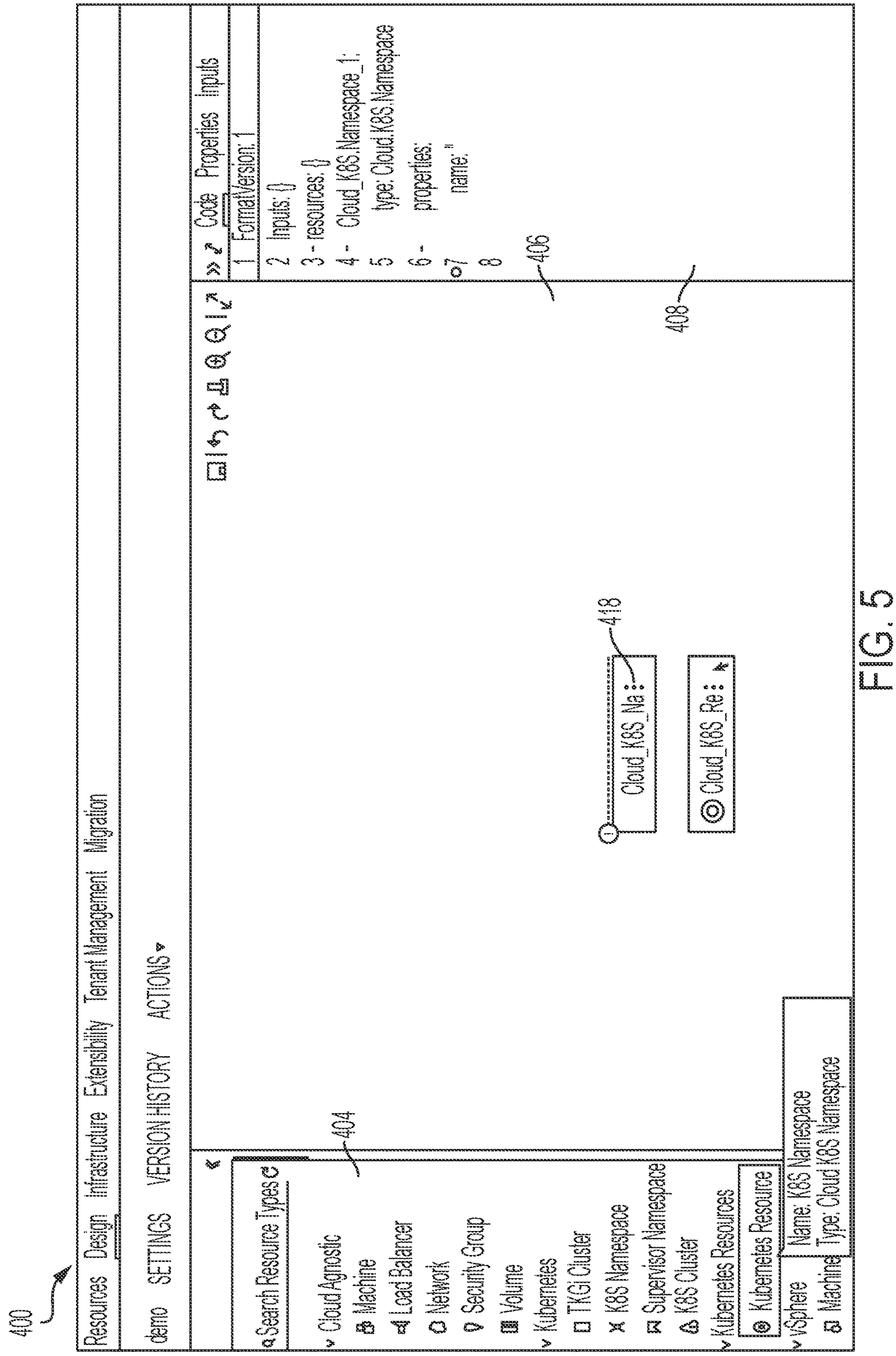

Continuing, at operation 304, a user defines a virtual infrastructure using GUI 400. For example, the user may drag, from icon selection portion 404, one or more virtual infrastructure components onto project canvas 406. Further, the user may edit definitions of the one or more virtual infrastructure components in code area 408. In additional or alternative embodiments, adding the infrastructure resource may include providing code (e.g., in the code area 408) associated with the one or more virtual infrastructure components to be configured. In one example, the user adds a namespace of a K8s cluster. For example, as shown in FIG. 5, the user drags a namespace 418 onto project canvas 406. Further, code area 408 is updated to include the namespace 418.

Figure 6:
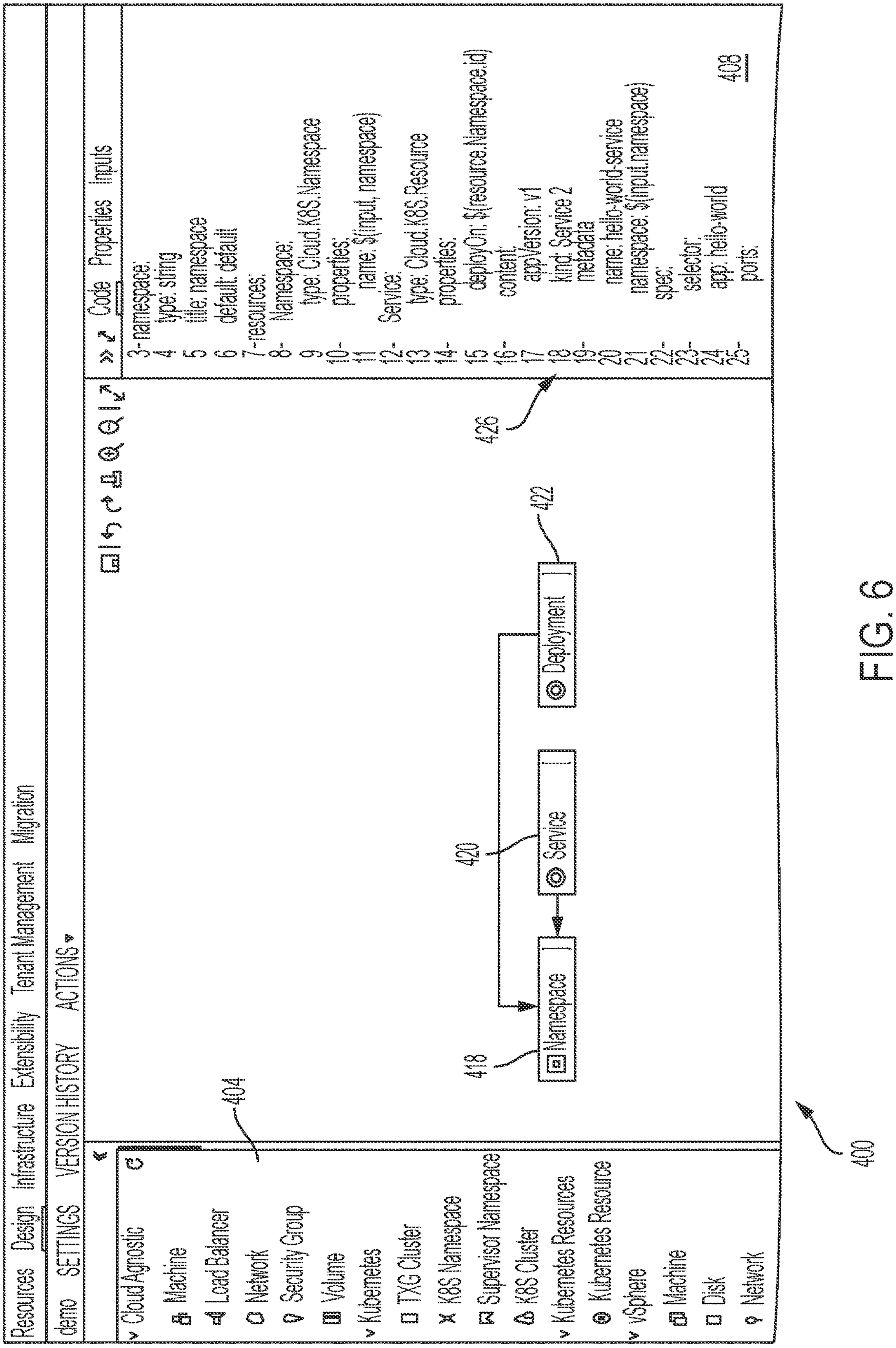

Further, at operation 306, a user defines one or more containerized workloads using GUI 400. For example, the user may drag, from icon selection portion 404, one or more application resources onto project canvas 406 that define the one or more containerized workloads. Further, the user may edit definitions of the one or more application resources in code area 408. In additional or alternative embodiments, adding the application resources may include providing code (e.g., in the code area 408) associated with the application resources to be configured. In one example, the user adds a service and a deployment to the namespace 418. For example, as shown in FIG. 6, the user drags a service 420 and a deployment 422 onto project canvas 406 as coupled to namespace 418. Further, code area 408 is updated to include the service 420 and a deployment 422.

Further, as shown in the example of FIG. 6, the code area 408 is updated to include a definition 426 of an application (e.g., application 132 shown as hello-world) to be deployed using the application resources. Accordingly, the unified deployment configuration template 200 is defined, and may correspond to the components and resources shown on project canvas 406, the code of which is shown in code area 408.

Figure 7:
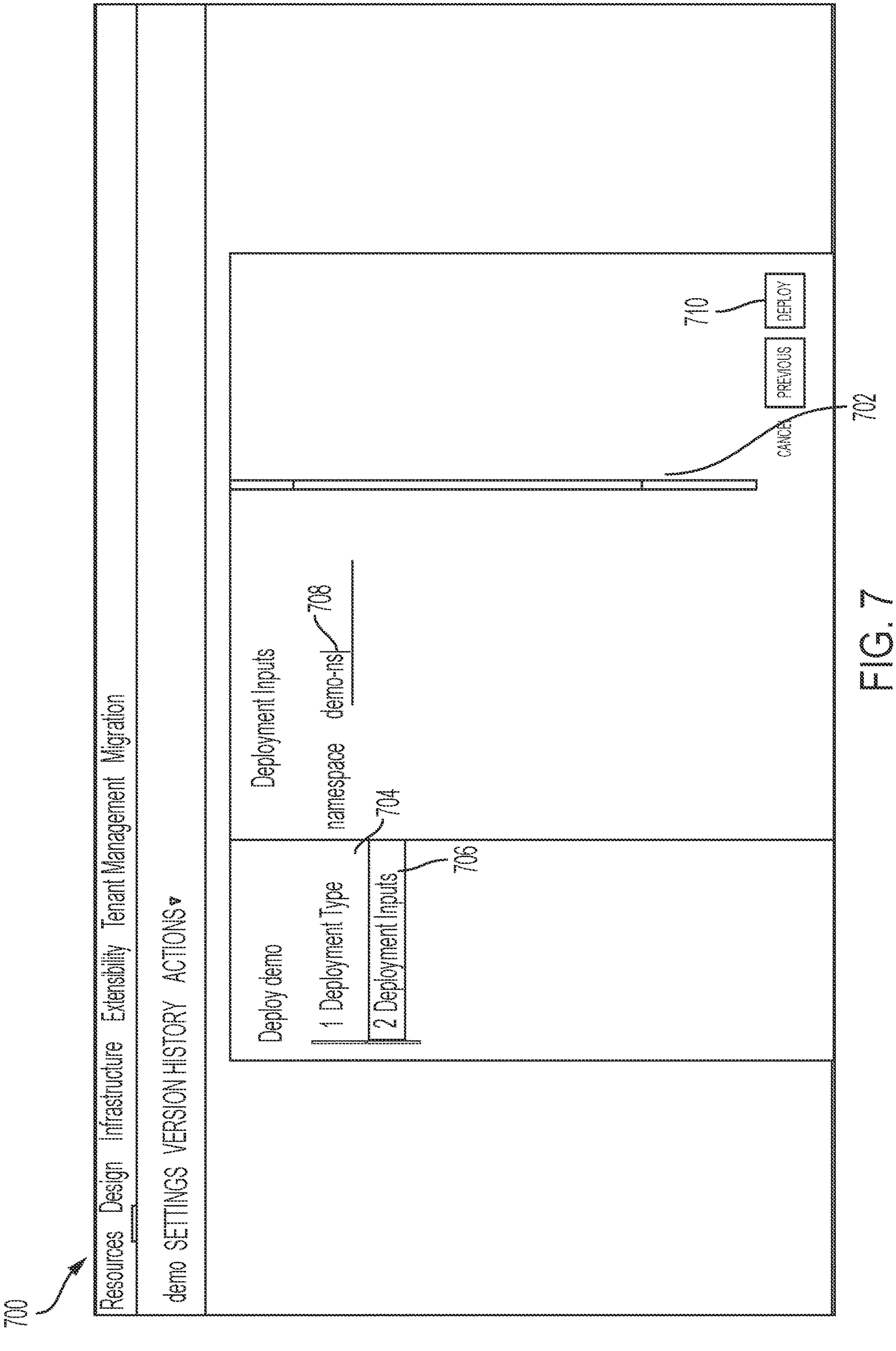

Continuing, at operation 308, a user initiates the discussed workflow for deploying the defined virtual infrastructure and containerized workload(s). For example, using a deployment creation view 700 of GUI 400, as shown in FIG. 7, the user can click a deploy button 710 to initiate the workflow discussed with respect to FIG. 2.

In an example, deployment creation view 700 of GUI 400 includes a deployment type icon 704 in a deployment screen 702 that allows for selection of specifics regarding deployment type in the deployment platform 201. As an example, when the deployment type icon 704 is selected, a create a new deployment option may be selected from a resulting screen, and a deployment name (such as "demo") may be created. Any additional description for the deployment may be added if desired.

A deployment inputs icon 706 may allow for selection and/or entry of inputs for the deployment. For example, such deployment inputs may include defining a name for the namespace deployment (e.g., added namespace 418 of FIG. 6) in area 708, such as "demo-ns" shown in FIG. 7. In the illustrative embodiment, the project name may be "dd" for a cloud template named "demo," the application 132 may be named "hello-world," and the namespace for deployment and on which the application 132 is to be deployed may be "demons." Thus, in illustrative embodiment, the "hello-world" application 132 is deployed on the deployed "demo-ns" namespace.

Figure 8:
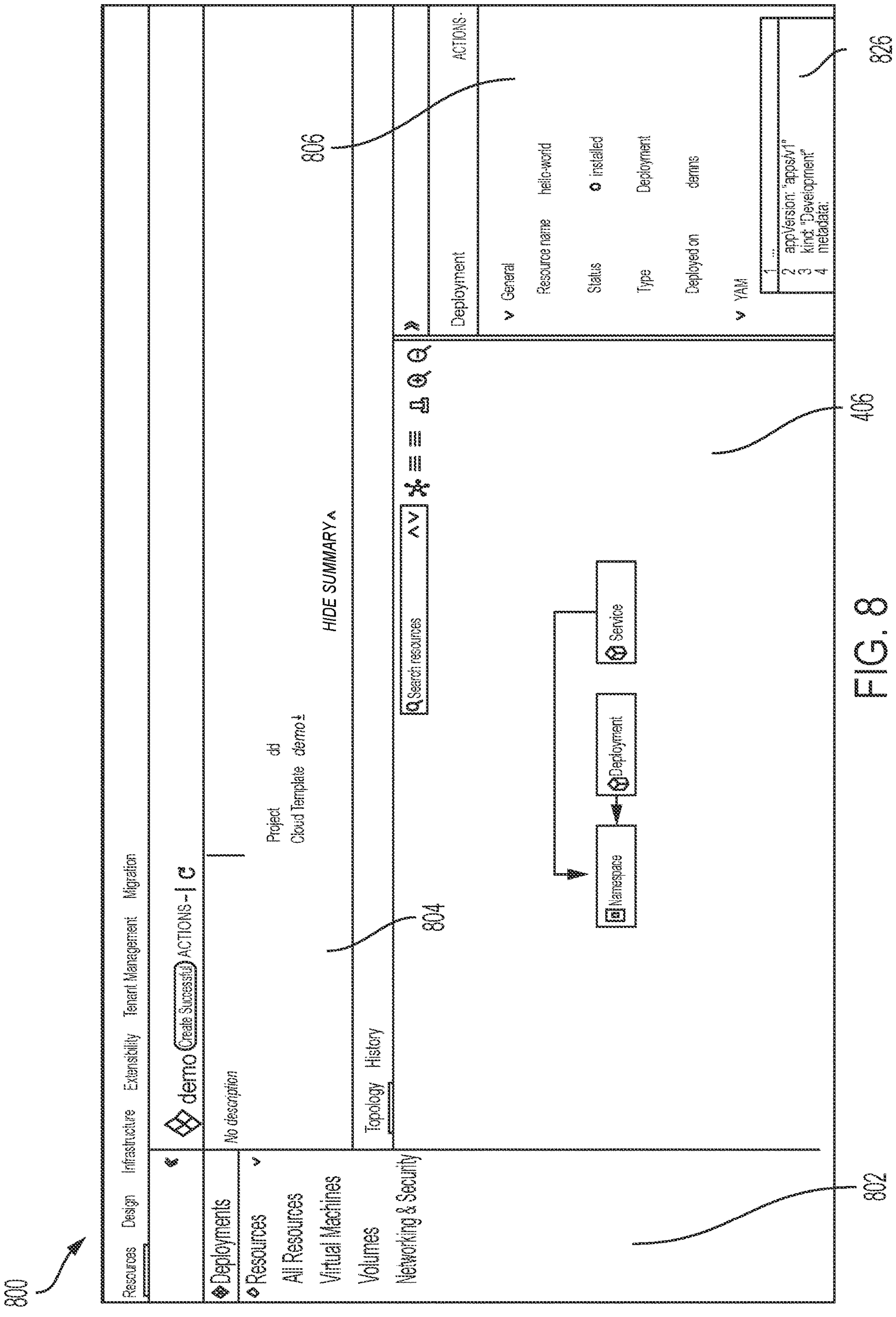

In certain aspects, GUI 400 further provides for viewing and/or managing the deployed virtual infrastructure and containerized workload(s). For example, FIG. 8 illustrates a deployed view 800 of GUI 400. For example, a deployments portion 802 may list icons of infrastructure and resources linked to the deployment, a summary screen 804 may link topology and history associated with the deployment, and a deployment information portion 806 may list details of the deployment, such as the associated YAML definition 826 and the deployment of the application 132 on the deployed namespace as infrastructure. For example, FIG. 8 shows the deployment of the application "hello-world" on the namespace of "demo-ns" along with all resources, their statuses, and YAMLs.

Within the GUI 400 of the deployment platform 201, a command window may be accessed to validate the deployment as well. By way of example, and not as a limitation, a command of "% kubectl get ns-w" may allow for metadata for the deployed namespace "demo-ns" to be retrieved and displayed, showing an Active status and age of deployment. A command of "% kubectl get deployments-n demo-ns" may allow for the deployed application 132 name (e.g., "hello-world") on the "demo-ns" namespace to be displayed. A command of "% kubectl get svc-n demo-ns" may allow for deployed application location and service details to be retrieved, such as a name of "hello-world-service" of type LoadBalancer having a cluster IP address of 10.105.237.186 and an external IP address of 10.62.80.102 with port(s) 80:30003/TCP and an associated age. The external IP address may be used to access the deployed application 132. For example, the "hello-world" application can be accessed which will generate and display an associated messaging (such as "Greetings!").

A unified deployment configuration template as described herein permits coding associated with infrastructure and application to be located in a single template, which permits repeatability of deployment results and access of the single template to apply any changes to the infrastructure and/or application. If such a change is made to create a new changed version of the template as a new template, all the deployed environments may then be updated to the new changed version, and any new environments can be associated with the new template. Such automatic upgrading is more streamlined with fewer resulting errors than alternative approaches of using a separate template for an infrastructure deployment and a separate template for an application deployment, where the infrastructure is deployed separate from the application. Thus, any changes would need to be made in the multiple separate templates, which could also result in potential for mismatch of the changes made to infrastructure and/or application in the separate templates.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system. Containers are implemented using operating system-level virtualization, wherein an abstraction layer is provided on top of the kernel of an operating system on a host computer. The abstraction layer supports multiple containers each including an application and its dependencies. Each container runs as an isolated process in user space on the host operating system and shares the kernel with other containers. The container relies on the kernel's functionality to make use of resource isolation (CPU, memory, block I/O, network, etc.) and separate namespaces and to completely isolate the application from other applications in other containers yet running on the same operating system. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for unified virtual infrastructure and containerized workload deployment via a deployment platform, the method comprising:

receiving, at the deployment platform, a definition of the virtual infrastructure and the containerized workload, wherein the virtual infrastructure comprises a container cluster and a namespace of the container cluster, and wherein the definition comprises a single unified deployment configuration template that defines both the virtual infrastructure and the containerized workload;

sending, by the deployment platform, first information comprising the definition of the virtual infrastructure to an infrastructure manager configured to deploy the virtual infrastructure including a container orchestrator; and sending, by the deployment platform, second information comprising the definition of the containerized workload to the container orchestrator configured to deploy the containerized workload on the deployed virtual infrastructure.

2. The method of claim 1, wherein sending the first information comprises sending a first request to a provider application programming interface (API) of the virtual infrastructure, and wherein sending the second information comprises sending a second request to a second API of the container orchestrator.

3. The method of claim 1, wherein the definition of the containerized workload includes a definition of one or more application resources.

4. The method of claim 1, wherein the single unified deployment configuration template is a single file.

5. The method of claim 1, further comprising receiving a single input to initiate deployment of the virtual infrastructure and the containerized workload, wherein the sending the first information and the sending the second information automatically occur in response to receiving the single input.

6. The method of claim 1, wherein the definition of the virtual infrastructure identifies one or more virtual components of the virtual infrastructure.

7. The method of claim 6, wherein the one or more virtual components comprise one or more controllers or one or more virtual machines.

8. The method of claim 7, wherein the definition of the virtual infrastructure identifies configuration parameters for the one or more controllers or the one or more virtual machines.

9. The method of claim 1, wherein the definition of the containerized workload identifies one or more applications of the containerized workload.

10. The method of claim 9, wherein the definition of the containerized workload identifies one or more containers grouped into one or more pods for running the one or more applications.

11. The method of claim 10, wherein the definition of the containerized workload identifies configuration parameters for one or more resources that support the one or more pods.

12. A non-transitory computer readable medium comprising instructions that, when executed by one or more processors of a computing system, cause the computing system to perform operations for unified virtual infrastructure and containerized workload deployment via a deployment platform, the operations comprising:

receiving, at the deployment platform, a definition of the virtual infrastructure and the containerized workload, wherein the virtual infrastructure comprises a container cluster and a namespace of the container cluster, and wherein the definition comprises a single unified deployment configuration template that defines both the virtual infrastructure and the containerized workload;

sending, by the deployment platform, first information comprising the definition of the virtual infrastructure to an infrastructure manager configured to deploy the virtual infrastructure including a container orchestrator; and sending, by the deployment platform, second information comprising the definition of the containerized workload to the container orchestrator configured to deploy the containerized workload on the deployed virtual infrastructure.

13. The non-transitory computer readable medium of claim 12, wherein sending the first information comprises sending a first request to a provider application programming interface (API) of the virtual infrastructure, and wherein sending the second information comprises sending a second request to a second API of the container orchestrator.

14. The non-transitory computer readable medium of claim 12, wherein the definition of the containerized workload includes a definition of one or more application resources.

15. The non-transitory computer readable medium of claim 12, wherein:

the definition of the virtual infrastructure identifies one or more virtual components of the virtual infrastructure; and the one or more virtual components comprise one or more controllers or one or more virtual machines.

16. The non-transitory computer readable medium of claim 15, wherein the definition of the virtual infrastructure identifies configuration parameters for the one or more controllers or the one or more virtual machines.

17. The non-transitory computer readable medium of claim 12, wherein the definition of the containerized workload identifies:

one or more applications of the containerized workload;

one or more containers grouped into one or more pods for running the one or more applications; and configuration parameters for one or more resources that support the one or more pods.

18. A computer system for unified virtual infrastructure and containerized workload deployment via a deployment platform, the computer system comprising:

a memory; and at least one processor communicatively coupled to the memory, the at least one processor being configured to:

receive, at the deployment platform, a definition of the virtual infrastructure and the containerized workload, wherein the virtual infrastructure comprises a container cluster and a namespace of the container cluster, and wherein the definition comprises a single unified deployment configuration template that defines both the virtual infrastructure and the containerized workload;

send, by the deployment platform, first information comprising the definition of the virtual infrastructure to an infrastructure manager configured to deploy the virtual infrastructure including a container orchestrator; and send, by the deployment platform, second information comprising the definition of the containerized workload to the container orchestrator configured to deploy the containerized workload on the deployed virtual infrastructure.

19. The computer system of claim 18, wherein:

the definition of the containerized workload includes a definition of one or more application resources.

20. The non-transitory computer readable medium of claim 12, the operations further comprising receiving a single input to initiate deployment of the virtual infrastructure and the containerized workload, wherein sending the first information and sending the second information automatically occur in response to receiving the single input.

* * * * *